United States Patent [19]
Hapgood

[11] 3,921,961
[45] Nov. 25, 1975

[54] HOME FREEZING APPLIANCE

[75] Inventor: William H. Hapgood, Concord, Mass.

[73] Assignee: Raytheon Company, Lexington, Mass.

[22] Filed: Mar. 27, 1974

[21] Appl. No.: 455,157

Related U.S. Application Data

[63] Continuation of Ser. No. 352,761, April 19, 1973, abandoned.

[52] U.S. Cl. .................... 259/67; 62/457; 259/108; 259/DIG. 34
[51] Int. Cl.² ...................... B01F 7/16; F25D 3/08
[58] Field of Search ........ 259/66, 67, 108, DIG. 34; 62/457

[56] References Cited
UNITED STATES PATENTS

| | | |
|---|---|---|
| 1,555,701 | 9/1925 | Prichard et al. ............. 259/DIG. 34 |
| 2,039,736 | 5/1936 | Munters et al. ........................ 62/457 |
| 2,491,952 | 12/1949 | Calmes ........................ 259/DIG. 34 |
| 2,599,021 | 6/1952 | Se Bastian ................... 259/DIG. 34 |
| 3,780,536 | 12/1973 | Fishman et al. ............. 259/DIG. 34 |

*Primary Examiner*—Richard E. Aegerter
*Assistant Examiner*—Steven L. Stephan
*Attorney, Agent, or Firm*—Harold A. Murphy; J. D. Pannone; John T. Meaney

[57] ABSTRACT

Apparatus for freezing a product such as ice cream, which apparatus employs a selected eutectic solution which may be frozen in a home freezer and then, in turn, used to freeze the product, the solution, such as an aqueous solution of potassium chloride, being housed in a hollow-walled receptacle which contains the product to be frozen.

5 Claims, 7 Drawing Figures

HOME FREEZING APPLIANCE

CROSS REFERENCE TO RELATED CASES

This is a continuation of application Ser. No. 352,761, filed April 19, 1973 and now abandoned.

BACKGROUND OF THE INVENTION

The prior art is replete with devices for freezing products such as ice cream, and appliances for freezing such products in the home have always been popular. Several appliances for this purpose now exist, all of which provide for simultaneous agitation and freezing of the product mix. Agitation is usually provided by the rotation of paddles or dashers in the mix either manually or by motor.

Most known appliances of this character provide for the freezing of the product mix by means of a brine chamber which contains a brine solution surrounding the mixing chamber and which allows the transfer of heat from the mix to the brine solution. One such brine solution is commonly made by adding salt (NaCl) to water and ice. The addition of the salt allows the solution to remain unfrozen and absorb heat at temperatures below the freezing point of water (32°F), ice being added to the solution as needed to maintain proper freezing temperature.

Making and maintaining a brine solution is a relatively messy procedure and the process of freezing a product, such as when making ice cream, is therefore made less attractive. Furthermore, considerable time is necessarily involved.

One attempt to overcome these problems was the use of solidified carbon dioxide as a refrigerant. However, this was never proved suitable because of the extremely low temperature of carbon dioxide and the requirement that a heat-absorbing barrier be interposed between the refrigerant or its container and the product to be frozen.

Another attempt involved the use of strong liquor of ammonia as a refrigerant in a shell or outer container surrounding the mixing chamber. In this process the ammonia is allowed to evaporate and absorb heat from the product in the mixing chamber. The vaporized ammonia is then absorbed in water and the heat of absorption carried away by a stream of cool water. This system, however, was relatively complicated and messy, and also relatively expensive.

A further attempt involved what was known as a "negative heat storage device" which included a receptacle having hollow walls containing a freezing solution which was to be cooled in the freezer compartment of a refrigerator. The refrigerant comprised a solution of glycerin and water, or potassium carbonate and water. When the solution was sufficiently cooled to a mushy ice form the receptacle was removed from the freezer compartment and filled with mix which was agitated until frozen by the refrigerant. This process proved to be relatively unsatisfactory and time consuming.

SUMMARY OF THE INVENTION

In accordance with the present invention, a freezing appliance has been provided which permits relatively short time and economical freezing of a selected product without the need for the user to mix a brine solution, this being achieved by the use of a refrigerant which is selected to provide the correct temperatures for the freezing of the product and to allow maximum absorption of heat at those temperatures, without the need to continuously adjust the refrigerant during a freezing process.

The presently described appliance includes a mixing chamber having spaced walls forming a sealed chamber which contains a eutectic potassium chloride and water solution which maintains for a relatively considerable length of time a temperature of about 12.8°F, which temperature is sufficiently low enouth to freeze a product such as ice cream to a temperature of about 23°F. The 12.8°F temperature of the eutectic solution is substantially lower than the average 23°F temperature of an ice-salt solution commonly used for freezing ice cream.

The eutectic solution is chosen for its latent and specific heats which should be as high as possible so that the heat storage capability of the fluid per unit volume or unit weight is maximized. It is important that the fluid has a freeze temperature above the temperatures available in home freezers, approximately 0°F, and below the desired final temperature of the frozen product, this being about 20°F for ice cream.

Water is a desirable freeze fluid in that it has high specific heats and a high latent heat of fusion. However, its freeze temperature is too high. Therefore, aqueous solutions whose solutes modify the freeze temperature to desirable values while maintaining the high heat storage capability in the water are the best choices for the freeze fluid.

Potassium chloride has been found to possess the desired characteristics as the solute in water, thus providing a eutectic having a freeze temperature in the range desired for home freezing of ice cream, for example.

BRIEF DESCRIPTION OF THE DRAWINGS

The above and other objectives of this invention will become apparent from the following description taken in connection with the accompanying drawings, wherein.

DESCRIPTION OF THE PREFERRED EMBODIMENT

Figure 1:
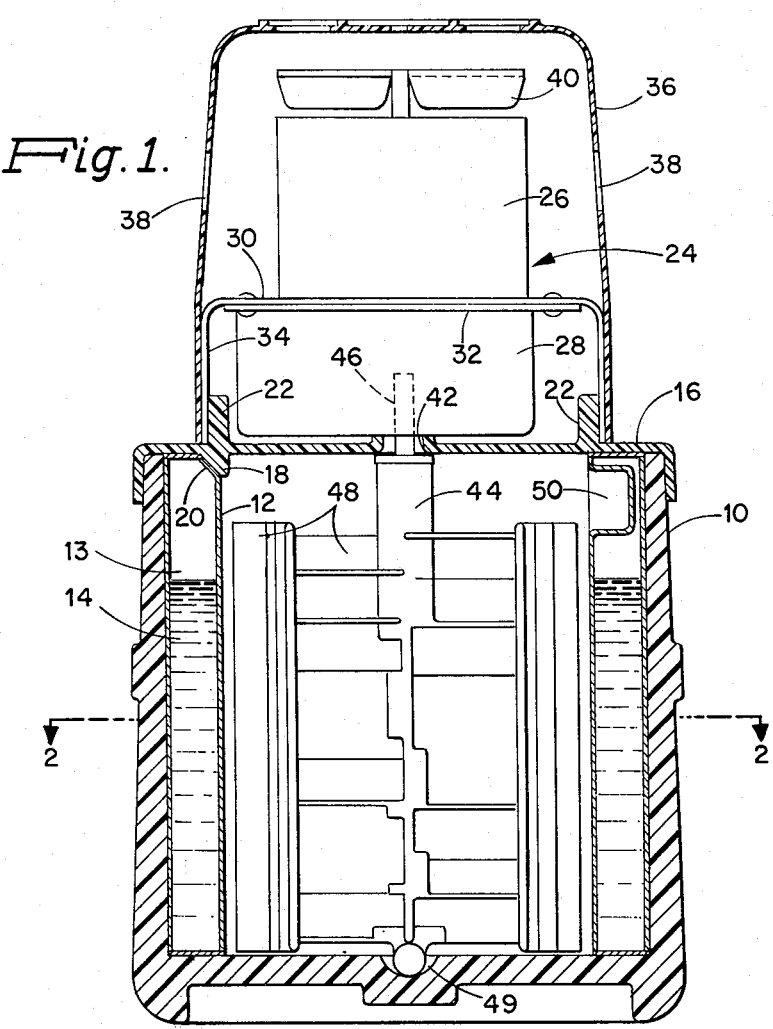
FIG. 1 is a vertical sectional view through a freezing appliance embodying the invention.
Figure 2:
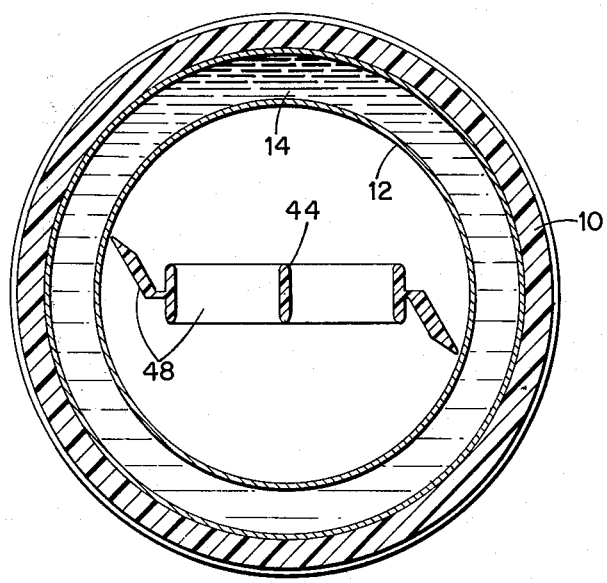
FIG. 2 is a horizontal sectional view through the appliance taken substantially on line 2—2 of FIG. 1.

Referring to FIGS. 1 and 2, there is shown an appliance which may be used to home freeze a product such as ice cream in accordance with the present invention. This appliance is motorized, as will be described, and may be made to handle any desired capacity such as one-half gallon, for example.

A freezer container 10 is preferably formed as an open-top hollow cylinder of metal or high impact plastic. A freezer cylinder 12 is a double walled metal cylinder open at both top and bottom and shaped to snugly but slidably interfit within the container 10. The sealed space 13 within the hollow walls of the cylinder 12 is partially filled with a eutectic freeze solution 14 to be described hereinafter.

A freezer cover 16 of metal or molded high impact plastic fits over the upper end of the container 10 and is provided on its under side with at least one projection 18 which interfits within a comating recess 20 provided in the upper inner peripheral edge of the container for preventing relative motion between the container and cover. Cover 16 is also provided with a number of upwardly directed projections 22 for attachment of the motor assembly 24.

Motor assembly 24 includes a motor 26 and gearbox 28 which is mounted as a unit in a motor mount 30, the unit being provided with a circumferential flange 32 by which it is bolted, riveted or otherwise attached to the motor mount within an aperture therein. The motor mount 30 is preferably a metal bracket which is sufficiently rigid to support the motor-gearbox assembly 24 and is provided within a downwardly extending circumferential flange portion 34 which fits over the projections 22 on cover 16 to retain the motor assembly in the proper location. The flange portion 34 is preferably secured to the projections 22 by screws (not shown).

The motor 26 may be provided with a suitable cord (not shown) by which it may be connected into an electrical circuit for operation in the normal manner. Mounted over the assembly 26 is a housing 36 the lower end of which closely encircles the flange portion 34 of the motor mount and is secured in place by the same screws by which the mount is secured.

Housing 36 is vented as at 38 so as to allow the motor 26 to be cooled and a fan 40 is mounted on the end of the motor to aid in such cooling.

The freezer cover 16 is provided with a central opening 42, and a dasher 44 is positioned within the cylinder 12. Dasher 44 has a drive bar or shaft 46 which projects upwardly through the opening 42 into the gear box 28 to be driven thereby. The dasher 44 may be of any suitable type having paddles and vanes 48 which agitate a product mix within the freeze cylinder 12 and scrape the inner walls thereof as the dasher is rotated.

In the process of freezing a product such as ice cream, the freeze cylinder 12 is removed from the container 10 and placed in a household freezer or freezer compartment of a refrigerator for a length of time suitable to freeze the eutectic solution. When the process of making ice cream is to be completed, the cylinder 12 is placed in the container 10 with its open bottom end firmly positioned on the base of the container as shown in FIG. 1. The dasher 44 is placed in the cylinder with its lower end located for rotation within a suitable recess 49 in the surface of the container base.

The ice cream mix or other selected product mix is poured into the interior of the cylinder up to the filling point, which allows for expansion and aeration. Then the motor assembly 24 and housing 36 are placed in position. Heat from the mix will immediately start to be absorbed by the eutectic solution 14, and the mix will simultaneously be agitated by operation of the motor 26 and consequent rotation of the dasher 44. This process will be allowed to continue until the mix is partially frozen, at which time the dasher is removed and the mix allowed to freeze to the desired consistency. When suitably frozen, the motor assembly 26, housing 36, and cover 16 are removed allowing the cylinder 12 to be removed with its contents for storing or consumption. Finger recesses 50 are provided in the upper inner surface of the cylinder above the level of the product therein for easy removal of the cylinder.

In further accordance with this invention, the freeze solution 14 is permanently contained with the sealed space 13 within the walls of the freeze cylinder 12. The freeze solution 14 is a eutectic which is specifically designed to provide the correct temperatures for the freezing of the product and to allow maaximum absorption of heat at those temperatures without requiring any adjustment of the solution.

Ice cream represents a good example of a product to be frozen by the presently described appliance. Ice cream contains milk fat, serum solids, sugar stabilizer and water. When the temperature of an ice cream mix is lowered, the contained water first begins to freeze. The initial freezing point is depressed to approximately 27.5°F by the presence of the sugar and other components, and the portion of the mix remaining unfrozen therefore becomes more and more concentrated and has its freezing point depressed further. The process continues until the mix component with the lowest eutectic temperature (calcium chloride at −60°F) in water freezes. Ice cream therefore freezes over a temperature range of 27.5°F to −60°F.

In commercial installations the ice cream mix is quickly frozen, while being agitated, to a temterature of 20°F – 25°F and then is subsequently frozen without agitation to temperatures less an 0°F for storage. Ideal serving temperatures of ice cream range from about 8°F to about 20°F.

Figure 3:
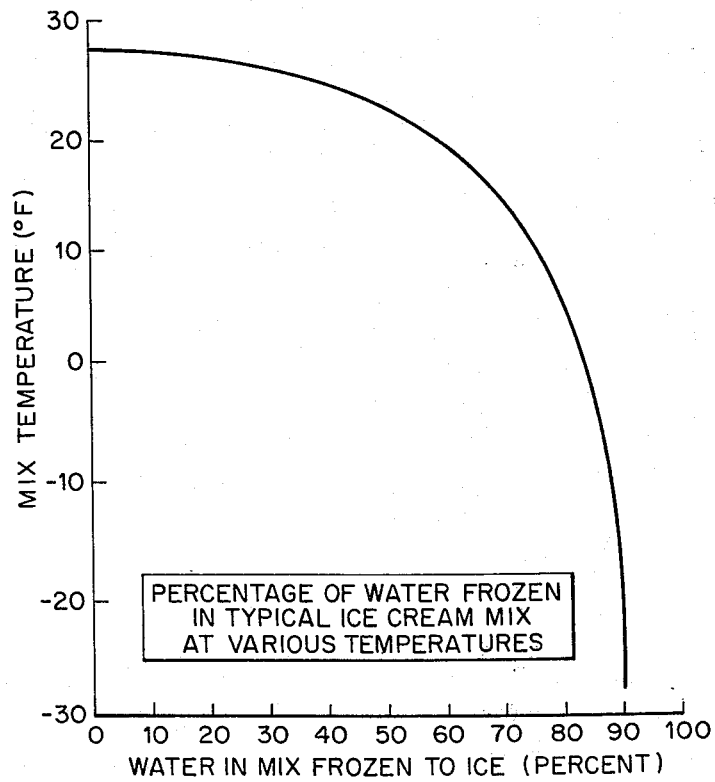
FIG. 3 is a graph illustrating a typical freeze curve for ice cream.

To provide a satisfactory home freezing appliance and to determine the most suitable freezing solution, it was necessary to complete a thermophysical analysis of the ice cream mix. The mix includes the following approximate composition: 12 percent milk fat, 6.5 percent serum solids, 15 percent sugar, 66.5 percent water. An assumed freeze curve typical for ice cream is shown in FIG. 3. A final frozen mix temperature of about 20°F and a 70 percent overrun are believed ideal for a home ice cream freezing process. Overrun is the increase in the volume of the mix as a result of agitation and resultant entrainment of air during the freezing process.

It was found that approximately 277 BTU of heat must be removed from a home-made ice cream mix to produce ½ gallon of ice cream at 20°F in an insulated container with motor-operated agitation for 30 minutes or less.

Several parameters are important in the selection of a heat transfer fluid for the freeze chamber, such as latent heat of fusion, specific heats for solid and liquid phases, freeze temperature, expansion characteristics, corrosivity, thermal conductivity and solubility for aqueous solutions. The latent and specific heats of the fluid should be as high as possible so that the heat storage capacity of the fluid per unit volume or unit weight is maximized. For most potential fluids, the latent heat storage capability will far exceed the specific heat storage capabilities, given the temperature range constraints, and it is important that the fluid has a freeze temperature which ensures freezing at temperatures above those available in home freezers (approximately 0°F) and below the desired final temperature of the ice cream mix (approximately 20°F).

High thermal conductivity is important in the transfer of heat from the ice cream chamber wall to the bulk of the freeze fluid. Minimum corrosivity and expansion are important to allow a simple design for the freeze chamber and solubility of components in aqueous solution is important for maintenance of proper freeze fluid characteristics.

Water is a desirable freeze fluid in that it has high specific heats and a high latent heat of fusion. However, its freeze temperature is too high. Therefore, aqueous solutions whose solutes modify the freeze temperature to desirable values while maintaining the high heat storage capability inherent in the water are the best choices for the freeze fluid.

Figure 4:
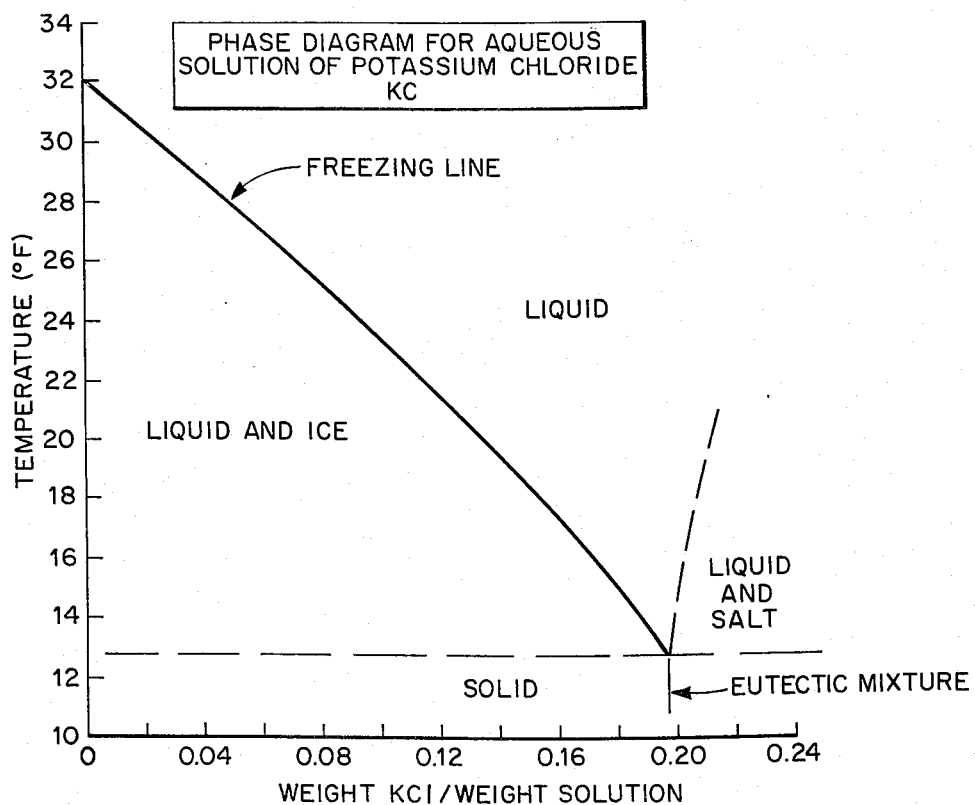
FIG. 4 is a phase diagram for an aqueous solution of potassium chloride.

The characteristics of most aqueous solutions with regard to freezing are exemplified by the phase diagram for an aqueous solution of potassium chloride shown in FIG. 4. As the amount of solute in the solution is increased, the temperature at which freezing begins is lowered until the eutectic mixture is reached. At this mixture, the minimum freeze temperature for the solution is obtained and the entire solution freezes at that temperature. If there is less than a eutectic proportion of solute in the solution, water will begin to freeze out of the solution at the temperature indicated by the freeze line, thereby increasing the proportion of solute in the unfrozen water. This process continues until the unfrozen liquid has a eutectic proportion of solute at which point the remaining liquid freezes. This occurs at the eutectic freeze temperature for the solution, regardless of the original solute concentration. If the amount of solute is greater than that of a eutectic mixture, lowering the temperature will cause the solute to freeze out until a eutectic mixture remains unfrozen. This will again freeze at the eutectic temperature.

In order to make use of the high heat of fusion of the water, it is important that the entire solution freeze and melt within the temperature cycle of the freezer. Therefore, the eutectic freeze temperature of the solution should be between 5°F (allowing some margin for expected operating temperatures in home freezer compartments), and 15°F (allowing a temperature difference from the 20°F ice cream temperature for the transfer of the heat at a reasonable rate). The eutectic freeze temperatures for potassium chloride, at 12.8°F, appears to be the best solute for the ice cream mix.

Figure 5:
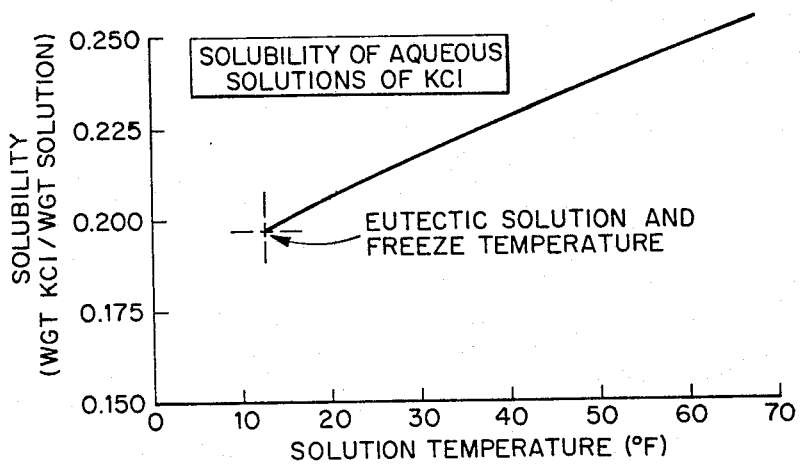
FIG. 5 is a graph showing the solubility of potassium chloride in aqueous solution as a function of solution temperature.
Figure 6:
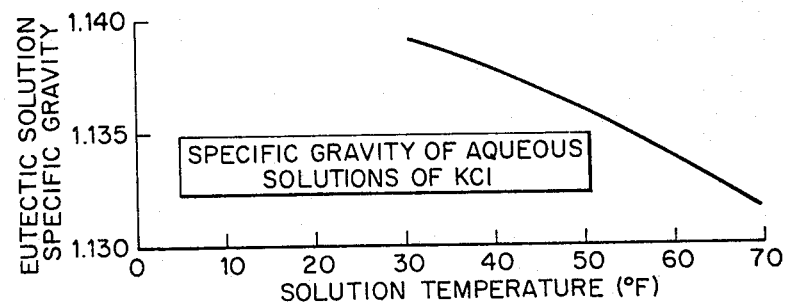
FIG. 6 is a graph illustrating the specific gravity of a eutectic solution as a function of solution temperature.
Figure 7:
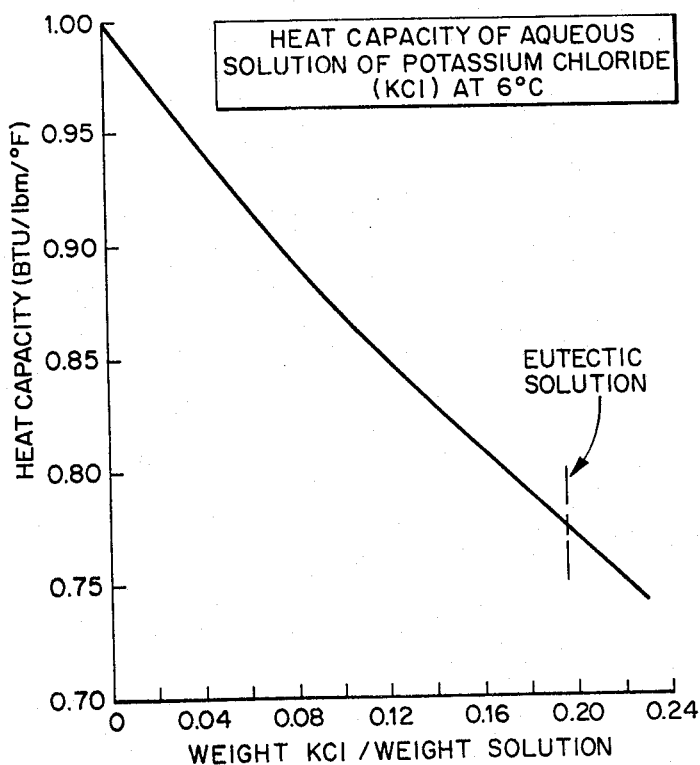
FIG. 7 is a graph showing the heat capacity of an aqueous solution of potassium chloride as a function of the weight percentage of solute in the solution.

Some of the properties of aqueous solutions of potassium chloride are shown in FIGS. 5, 6 and 7. FIG 5 shows the solubility of potassium chloride in aqueous solution and FIG. 6 shows the specific gravity of a eutectic solution as functions of solution temperature. It can be seen that the solubility of potassium chloride decreases with decreasing temperature until the eutectic freeze temperature is reached. The specific gravity of the eutectic solution is seen to increase with decreasing temperature.

FIG. 7 shows the heat capacity of an aqueous solution of potassium chloride as a function of the weight percentage of solute in the solution. It is seen that the addition of solute reduces the heat capacity significantly and that the heat capacity for a eutectic solution is 77 BTU/lb/°F. Heat capacity is not a strong function of solution temperature and this value is valid over the temperature range considered.

Assuming that a freeze solution is to be frozen to about 5°F in a home freezer, and the final temperature at which it is to be used is about 15°F to 18°F, ample heat transfer from the ice cream mix will take place. It has been found that about 2 pounds of eutectic solution of potassium chloride in water will provide enough heat absorption to freeze ½ gallon of ice cream.

It has further been found that a very satisfactory eutectic freeze solution may be made from about 4.5 lb. of water and 1.1 lb. of potassium chloride (KC1) with about 1–2 percent (20–40 grams) of glycerine added to minimize problems caused by expansion during initial freezing of the solution.

In accordance with the foregoing procedures, ice cream can be made in the home at significantly reduced freezing time periods compared to processes using ice/salt solutions, or the ice cream may be made to have a much lower final temperature. It will be apparent that the presently described freezing method is simple, clean and efficient, compared to other known home freezing methods.

It is to be understood, however, that various modifications and changes in the process and apparatus may be made by those skilled in the art without departing from the spirit of the invention as expressed in the accompanying claims. Therefore, all matter shown and described is to be interpreted as illustrative and not in a limiting sense.

I claim:

1. A freezer comprising a container having an open upper end, a receptacle removably located within the container and having an open upper end, a cover removably mounted over the open upper ends of said container and receptacle in closing relation thereto, said cover being a substantially planar disclike member having a central opening, a downwardly turned outer peripheral flange engaging the circumferential end portion of the container, and at least one projection extending downwardly from and engaging a comating recess in the adjacent end of the receptacle for preventing rotation of the receptacle with respect to the cover, a motor assembly mounted on said cover, a dasher within the receptacle and having drive means extending upwardly through the central opening in the cover into operative engagement with the motor assembly, and a housing enclosing said motor assembly and removably mounted on said cover.

2. A freezer as set forth in claim 1 wherein said container has a bottom wall closing its lower end, and said receptacle is open at its lower end and is seated directly upon said bottom wall.

3. A freezer as set forth in claim 1 wherein said container and receptacle have their upper ends disposed in a common transverse plane, and the major portion of said cover is flat and disposed simultaneously on said upper ends in closing relation to both said container and receptacle.

4. A freezer as set forth in claim 1 wherein said motor assembly comprises a bracket having a central portion and having leg portions mounted on said cover, and a motor and gear box fixed to the central portion of said bracket, said dasher being operatively connected to said gear box.

5. A freezer as set forth in claim 4 wherein said cover is provided with upwardly extending projection means on its upper surface, said leg portions of the bracket embrace said projection means, and said housing has its lower end closely encircling said bracket leg portions.

* * * * *

UNITED STATES PATENT OFFICE
CERTIFICATE OF CORRECTION

Patent No. 3,921,961            Dated November 25, 1975

Inventor(s) William H. Hapgood

It is certified that error appears in the above-identified patent and that said Letters Patent are hereby corrected as shown below:

In the Specification

Column 2, line 9, "enouth" should be --enough--.

In the Claims

Column 6, line 37, insert after "downwardly from", --the cover--

*Signed and Sealed this*

*twenty-fourth* Day of *February 1976*

[SEAL]

Attest:

RUTH C. MASON
*Attesting Officer*

C. MARSHALL DANN
*Commissioner of Patents and Trademarks*